United States Patent [19]

Omi

[11] Patent Number: 4,600,266

[45] Date of Patent: Jul. 15, 1986

[54] LIGHT BEAM SCANNING APPARATUS WITH A VARIABLE SCANNING WIDTH

[75] Inventor: Kyoji Omi, Kawasaki, Japan

[73] Assignee: Ricoh Company, Ltd., Japan

[21] Appl. No.: 530,232

[22] Filed: Sep. 8, 1983

[30] Foreign Application Priority Data

Sep. 9, 1982 [JP] Japan ................. 57-157286

[51] Int. Cl.[4] ............. G02B 26/10; G03G 15/28
[52] U.S. Cl. ................. 350/3.71; 350/6.7; 355/8
[58] Field of Search ............. 350/3.71, 6.7, 6.8; 355/8; 356/431

[56] References Cited

U.S. PATENT DOCUMENTS 4,165,464  8/1979  Ikeda et al. ............... 350/3.71
4,294,534 10/1981  Snelling ..................... 355/8

FOREIGN PATENT DOCUMENTS 0104102  6/1982  Japan ..................... 350/6.2

Primary Examiner—Bruce Y. Arnold
Attorney, Agent, or Firm—Guy W. Shoup

[57] ABSTRACT

A light beam scanning apparatus includes a laser device for emitting a laser beam, a deflector for periodically deflecting the laser beam thereby causing the laser beam to scan an object to be scanned, which is being moved in a predetermined direction, across a varyingly set scanning width. The scanning width is set in accordance with the size of the object to be scanned and the moving speed of the object is changed depending on the particular scanning width.

4 Claims, 5 Drawing Figures

LIGHT BEAM SCANNING APPARATUS WITH A VARIABLE SCANNING WIDTH

BACKGROUND OF THE INVENTION

1. Field of the Invention

This invention relates to a light beam scanning apparatus using a light beam such as a laser beam, and, in particular, to a light beam scanning apparatus capable of selectively adjusting the scanning width of a light beam.

2. Description of the Prior Art

A light beam scanning apparatus using a light beam such as a laser beam is well known in the art. Typically, such a light beam scanning apparatus is employed in a recording machine, such as printers and electrophotographic copiers, for optically reading an original document or forming a latent image on the surface of a photosensitive member which has been charged uniformly previously, as well known in the art. Such a light beam scanning apparatus is disclosed, for example, in U.S. Pat. No. 4,294,534. This patent discloses a composite mode copier using xerography, and it is provided with three modes of operation: normal copy mode, laser beam write mode and laser beam read mode. In accordance with the teachings of this patent, a scanning system comprised of a laser oscillator, a hologram light deflector, a fθ lens, etc. is used to scan across the width of the surface of a photosensitive drum. And, the drum is driven to rotate at a normal speed during scanning operation. Other prior art light beam scanning apparatuses are disclosed, for example, in Japanese Laid Open Patent Publications Nos. 57-82815 and 57-85018, and the apparatuses disclosed in these publications use hologram as a light beam deflector.

Any of these prior art scanning apparatuses is so structured to carry out light beam scanning across a predetermined single scanning width, as determined in light of the maximum width of a transfer medium to be used. Accordingly, even if original documents to be scanned have different widths or use is made of transfer mediums, to which a copy image reproduced on the drum is to be transferred, having different widths, scanning is carried out across the full scanning width at all times. This is disadvantageous, however, because it is, in fact, not necessary to carry out scanning across the full width when use is made of shorter original documents and/or transfer mediums.

SUMMARY OF THE INVENTION

The disadvantages of the prior art are overcome with the present invention and an improved light beam scanning apparatus is provided. The present light beam scanning apparatus may be used to either optically read an original document or record an image on an imaging surface. A main feature of the present light scanning apparatus is the ability to vary the scanning width in accordance with the size of an original document to be read and/or the size of a recording or transfer medium to be used. With such a structure, the scanning time may be optimized in view of the sizes of original documents and/or recording mediums.

It is therefore a primary object of the present invention to provide an improved light beam scanning apparatus.

Another object of the present invention is to provide a light beam scanning apparatus capable of varying the scanning width selectively.

A further object of the present invention is to provide a light beam scanning apparatus having a high scanning efficiency.

A still further object of the present invention is to provide a light beam scanning apparatus which is particularly suited for use in a recording machine as a unit for optically reading an original document and/or forming a reproduced image on an imaging surface.

Other objects, advantages and novel features of the present invention will become apparent from the following detailed description of the invention when considered in conjunction with the accompanying drawings.

DESCRIPTION OF THE PREFERRED EMBODIMENTS

Figure 1:
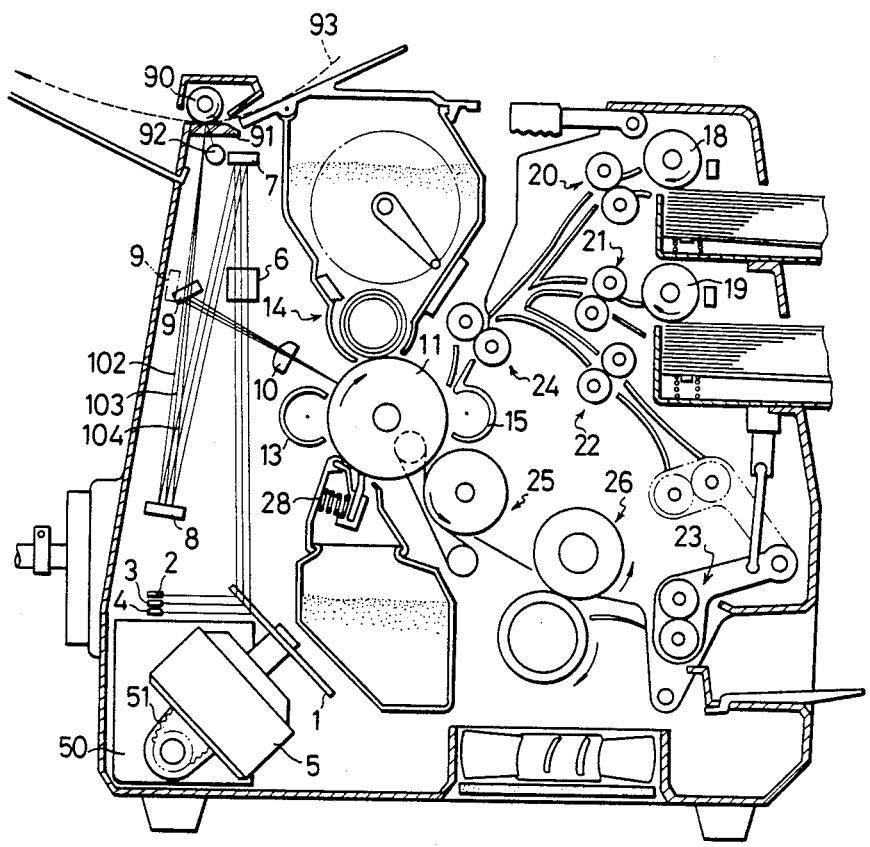
FIG. 1 is a schematic illustration showing a recording machine into which the present light beam scanning apparatus is incorporated.

Referring now to FIG. 1, there is shown a recording machine to which the present light beam scanning apparatus has been incorporated as a means for optically reading an original document and/or forming an electrostatic latent image on a photosensitive member provided on the peripheral surface of a drum. Thus, the recording machine of FIG. 1 has at least two modes of operation: write mode and read mode. As shown, the present light scanning apparatus is generally disposed to the left in the housing of the recording machine, and it includes a hologram disc 1, three semiconductor laser devices 2–4, a motor 5 for driving to rotate the hologram disc 1, a fθ lens 6, reflecting mirrors 7–9, and a correction lens 10. As will be made clear later, the scanning direction of this light beam scanning apparatus defines a so-called main scanning direction which is perpendicular to the direction of advancement of an object to be scanned, such as an original document or a photosensitive member, which is normally termed as an auxiliary scanning direction. As shown at bottom left, there is provided a variable speed motor 50 for causing to advance a driving belt 51, which, in turn, causes to rotate not only an original driving roll 90, which is disposed at top left in FIG. 1, but also a photosensitive drum 11, which is disposed generally at center. Thus, each of the elements 90 and 11 defines a unit for carrying out auxiliary scanning.

The recording machine shown in FIG. 1 also includes a corona charging device 13, a developing device 14, a transferring device 15, a separating device 25, and a cleaning device 13 disposed in the order mentioned along the peripheral surface of the photosensitive drum 11 in the direction of rotation of the drum 11. Thus, as the drum 11 rotates, a well-known electrophotographic copying process is carried out. Also disposed in the recording machine are pick-up rollers 18 and 19, each of which feeds sheets of transfer paper of predetermined size one by one from a stack when driven to rotate in the direction indicated by the arrow. Transport rollers 20, 21 and 22 are appropriately disposed for transporting a sheet of transfer paper along a travelling path defined in the machine. A pair of registration rolls 24 is also provided, and these rolls are driven to rotate to transport a sheet of transfer paper in association with the rotation of the drum 11. In the downstream of the separating device 25 for positively separating a sheet of transfer paper from the peripheral surface of the drum 11 is disposed a fixing device 26 for having a transferred image fixed to the sheet of transfer paper as it passes therethrough. A pair of discharging rolls 23 is disposed in the downstream of the fixing device 26 for guiding the advancement of the sheet of transfer paper to be discharged out of the machine.

It is to be noted that the reflecting mirror 9 is movable to take two operating positions. When it is moved to take the position indicated by the solid line, it serves to direct the incoming light beam toward the peripheral surface of the drum 11, and, thus, the light beam scanning device functions as a writing unit for writing image information on the surface of the drum 11. On the other hand, when the mirror 9 is moved to take the position indicated by the phantom line, it moves out of the optical path defined between the reflecting mirror 8 and a contact or platen glass plate 91, and, thus the light image from an original moving past the contact glass plate 91 may impinge upon the reflecting mirror 8.

Figure 2:
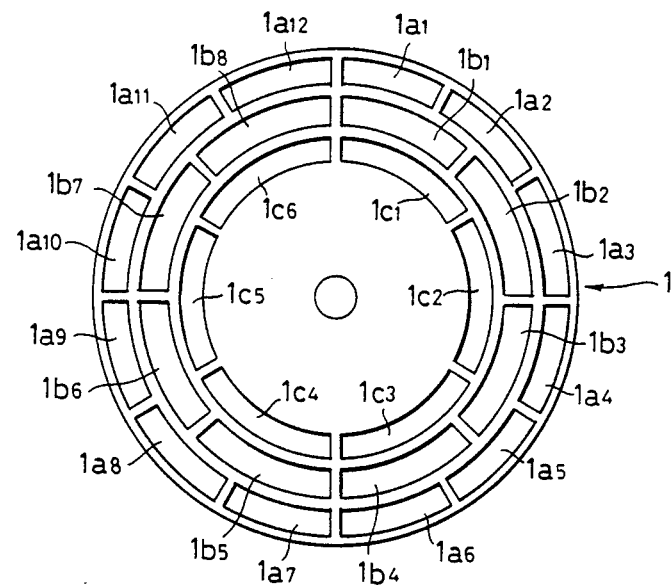
FIG. 2 is a plan view showing the structure of the hologram disc which is used as a light beam deflector of the light beam scanning apparatus shown in FIG. 1.

The detailed structure of the hologram disc 1 is shown in plan view in FIG. 2. As shown, the hologram disc 1 includes three groups of diffraction gratings arranged in three concentric circles different in diameter. The outermost circle includes 12 gratings $1a1$ through $1a12$ arranged at equal angular interval in axial symmetry, which define group (a) gratings. The medium circle includes 8 grantings $1b1$ through $1b8$ also arranged at equal angular interval in axial symmetry, which define group (b) grantings. The innermost circle includes 6 gratings $1c1$ through $1c6$ also arranged at equal angular interval in axial symmetry, which define group (c) gratings.

Figure 3:
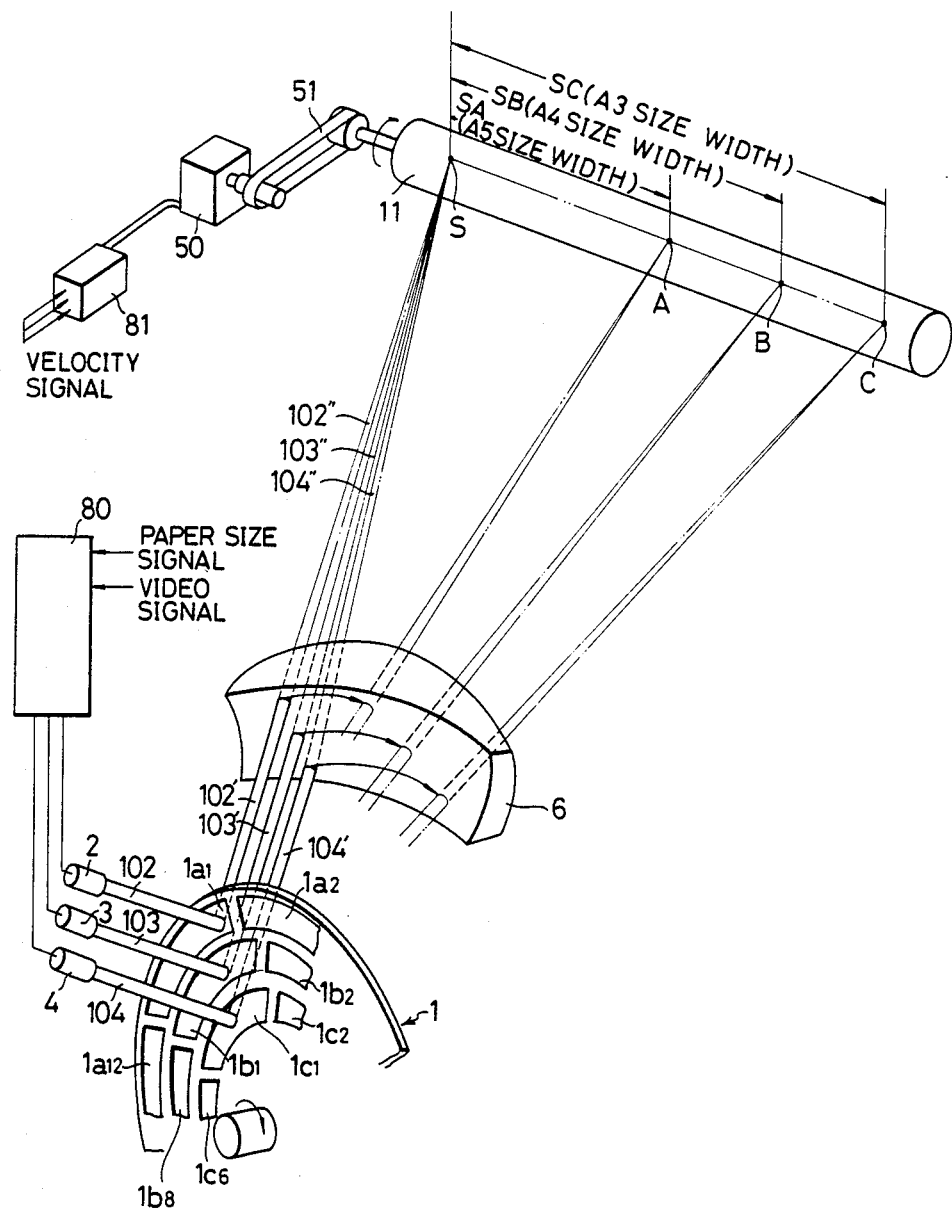
FIG. 3 is a perspective view schematically showing the overall structure of the present light beam scanning apparatus.

Now, the operation of the recording machine will be described when the machine is in write mode with particular reference to FIG. 3. FIG. 3 is a perspective view showing the present light beam scanning apparatus incorporated in the recording machine of FIG. 1, but a few components, such as mirrors 7-9 and correction lens 10, have been removed for the ease of understanding. It should be noted that the semiconductor laser devices 2-4 are so disposed to emit their laser beams 102, 103 and 104 in parallel to respective group of gratings (a), (b) and (c) as shown, and, since these three groups of gratings are isotropically arranged on the disc 1, the laser beams 102, 103 and 104 are diffracted similarly by the respective gratings of the disc 1. Accordingly, laser beams 102', 103' and 104' diffracted by the respective gratings of the disc 1 are maintained in parallel from one another.

Figure 4:
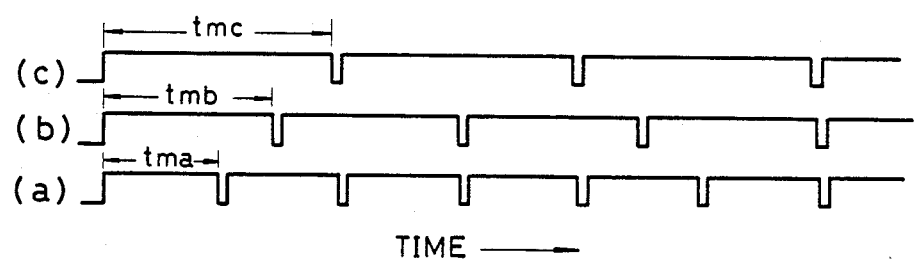
FIG. 4 is a timing chart which is useful for understanding the operation of the structure shown in FIG. 3.

The diffracted laser beams 102', 103' and 104' enter into the $f\theta$ lens 6 and they are converged as they pass through the lens 6 to be focused onto the peripheral surface of the photosensitive drum 11 at point S thereby forming an image there. As the hologram disc 1 is driven to rotate at constant speed in the direction indicated by the arrow by means of the driving motor 5, the diffracted laser beams 102', 103' and 104' entering into the $f\theta$ lens 6 are caused to move in the directions indicated on the surface of the lens 6. Of importance, since the number of gratings provided in each of the respective groups (a), (b) and (c) differs, the angle of deflection of a laser beam caused by a single grating is different from one group from another. Stated differently, the distance of movement of the deflected laser beam along the surface of the $f\theta$ lens 6 is different one laser beam from another, as clearly shown in FIG. 3. Since the outermost circle or group (a) includes the largest number of gratings of the three, i.e., more finely divided, the expance of travel of the deflected laser beam 102' on the surface of the lens 6 is the smallest. Thus, the angle of deflection of the laser beam 102' is the smallest. FIG. 4 illustrates the timing (for half cycle) of deflection of respective laser beams passing through the respective groups of gratings when the disc 1 is driven to rotate at constant speed.

Such being the case, the laser beam 102" originating from one of group (a) gratings scans from point S to point A along the peripheral surface of the drum 11. Similarly, the other laser beams 103" and 104" originating from respective ones of group (b) and (c) gratings, respectively, scan from point S to points B and C, respectively, in the widthwise direction along the peripheral surface of the drum 11. As a result, by selectively energizing one of the three laser devices 2 through 4, the scanning length or width in the main scanning direction may be set at any one of SA, SB and SC. A mechanism for carrying out such a selection may be easily constructed for those skilled in the art. For example, it may be so structured to supply a paper size signal indicating the size of a sheet of transfer paper to be used to a driving circuit 80 for controlling the drive of the laser devices 2-4, thereby allowing to automatically select a desired laser device to be used.

In this manner, the hologram disc 1 provided with a plurality of groups of hologram gratings arranged in concentric circles different in diameter and number constitutes one example of means for varying the scanning distance along the surface of an object to be scanned such as the photosensitive drum 11 in the above-described embodiment. Further, the driving circuit 80 for supplying an energization signal to each of the laser devices 2-4, selectively, constitutes one example of means for selecting one of a predetermined number of scanning distances or widths for use.

Now, the control of auxiliary scanning in association with the selection of scanning width will be described. As may be understood from the timing chart of FIG. 4, a main scanning period tm for a single scanning line differs depending upon the size of a sheet of transfer paper used. Thus, in order to obtain a properly recorded image, it is necessary to set the auxiliary scanning speed inversely proportional to the main scanning period tm. For example, as shown in FIG. 3, assuming that width SC corresponds to the width of a A3-sized sheet of transfer paper and designating the main scanning period by tmc, the auxiliary scanning speed by Vc and the main scanning period for width SA (corresponding to the width of a A5-sized sheet of transfer paper) by tma, the following relation holds for the auxiliary scanning speed Va.

$$Va = Vc \times (tmc/tma)$$

In order to carry out such a changeover of the auxiliary scanning speed, it may be so structured that a velocity signal indicating the auxiliary scanning speed as determined above is supplied to a servo-motor driver 81 which controls the rotational speed of the motor 50, as shown in FIG. 3. In this manner, the motor 50 and the driving belt 51 constitute an auxiliary scanning driving means for driving to move an object to be scanned, such as the photosensitive drum 11, in the auxiliary scanning direction. The servo-motor driver 81 is one example of changing the auxiliary scanning speed in accordance with the main scanning width selected. A change in auxiliary scanning speed indicates a change in peripheral speed of the photosensitive drum 11 in the above-described embodiment, so that, in this case, it is preferable to also change the operating conditions of the remaining electrophotographic process components. For instance, corona current at the charging and transfer devices 13 and 15, a bias voltage at the developing device 14, temperature of the fixing roll at the fixing device 26, etc. had better be properly adjusted in view of the rotational speed of the photosensitive drum 11.

The operation of read mode will now be described. In this case, as described previously, the reflecting mirror 9 is moved to take the position indicated by the phantom line. Under the condition, as driven by the variable speed motor 50 through the driving belt 51, the original driving roll 90 is driven to rotate in the direction indicated by the arrow, so that an original document 93 present sandwiched between the roll 90 and the contact glass plate 91 is caused to advance in the direction indicated by the dotted line, thereby carrying out the auxiliary scanning. Since the mirror 9 is out of the optical path between the mirror 8 and the contact glass plate 91, the main scanning of the original document 93 is carried out by one of beams 102, 103 and 104 which are convergent toward the contact glass plate 91 to be focused onto the original document 93. The light beam reflected from the original document 93 enters into a photosensor 92 to produce an electrical image signal. In this manner, since one of three beams 102, 103 and 104, different in scanning width, may be selectively used, the main scanning width may be varingly set at a desired value depending upon the size of original document 93 to be scanned also in the read mode of operation.

Figure 5:
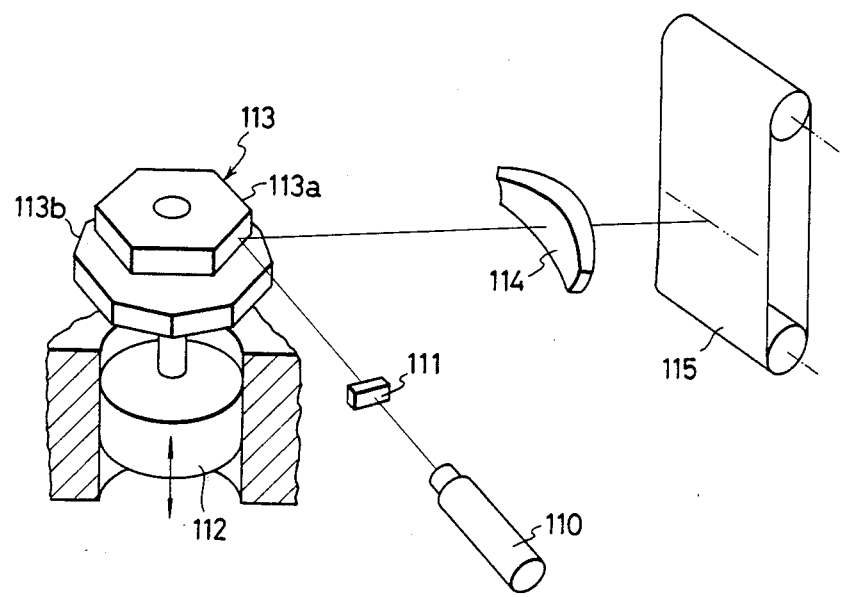
FIG. 5 is a schematic illustration showing another embodiment of the present light beam scanning apparatus.

FIG. 5 shows another embodiment of the main scanning portion of the present variable-widthed light scanning apparatus. The embodiment shown in FIG. 5 includes a gas laser device 110 emitting a laser beam which passes through an AO modulator 111 to impinge upon one facet of a polygonal mirror 113a, which is driven to rotate at constant speed by a motor 112. Thus, the laser beam is periodically deflected over a predetermined angle determined by the size of the facet of polygonal mirror 113a. The laser beam being deflected is then focused onto the surface of a photosensitive belt 115 through a fθ lens 114. In the present embodiment, another polygonal mirror 113b is provided coaxially with the polygonal mirror 113a and thus the polygon 113b is also driven to rotate at the same rotational speed as that of the polygon 113a. These two polygons 113a and 113b have different number of facets; for example, the polygon 113a has six facets and the polygon 113b has ten facets in the present embodiment.

Since only a single source of laser beam is provided in the embodiment of FIG. 5, in order to vary the scanning width in the main scanning direction, the polygons 113a and 113b, together with the motor 112, are moved up and down to make the laser beam from the laser device 110 to impinge upon a selected one of the polygons 113a and 113b. On the other hand, it may also be so structured that the laser device 110 is moved up and down with respect to the polygons 113a and 113b, which are provided immovable vertically. Similarly, in the previous embodiment of FIG. 3, it may be so structured that only a single semiconductor laser device is provided and a laser beam is selectively directed to one of the groups of gratings, for example, by moving the laser device in the radial direction of the hologram disc 1.

In accordance with the present invention, if the recording machine is capable of making copies of up to A3-sized sheet of transfer paper (main scanning width 297 mm and auxiliary scanning length 420 mm) at the rate of 10 copies per minute, then 40 copies per minute may be obtained for A5-sized sheet of transfer paper (main scanning width 148 mm and auxiliary scanning length 210 mm). Because, as compared with the A3-sized paper, in the case of A5-sized paper, the time required for main scanning is reduced to a half and the time required for auxiliary scanning is reduced to a quarter with the auxiliary scanning speed increased twice. Since the prior art device only allows to obtain 20 copies per minute, efficiency may be increased twice by the present invention. Furthermore, since the time period of activation of laser device may be reduced, the life time of the laser device may be prolonged, and, at the same time, power consumption may be cut down significantly. Besides, when the present invention is applied to a facsimile machine, the time required for main scanning may be reduced and the length of a scanned line may be reduced without producing a non-image area signal for a narrower-widthed original, the use rate of transmission line may be improved. For example, as compared with an A3-sized original, in the case of an A5-sized original, the transmission time may be reduced to a half.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Apparatus for scanning a light beam comprising:
   means for moving an object to be scanned in a first direction;
   means for emitting a light beam;
   means for periodically deflecting said light beam from said means for emitting thereby causing said light beam to scan said object in a second direction perpendicular to said first direction;
   means for setting the scanning width of said light beam in said second direction; and
   means for changing the moving speed of said object in relation to the scanning width in said second direction set by said means for setting.

2. Apparatus of claim 1 wherein said means for periodically deflecting includes a hologram disc and a motor for driving to rotate said hologram disc at constant speed, and said means for setting includes a plurality of groups of gratings arranged in concentric circles different in diameter and number on said disc.

3. Apparatus of claim 2 wherein said means for emitting includes a like plurality of semiconductor laser devices and a driving circuit for selectively activating one of said laser devices.

4. Apparatus of claim 2 wherein said means for periodically deflecting includes a plurality of polygonal mirrors, each having a different number of facets, and a motor for driving said polygonal mirrors at constant speed.

* * * * *